(12) United States Patent
Kim et al.

(10) Patent No.: US 9,285,284 B2
(45) Date of Patent: Mar. 15, 2016

(54) TORQUE ESTIMATION METHOD FOR TRANSMISSION CLUTCH

(71) Applicants: Hyundai Motor Company, Seoul (KR); Kia Motors Corp., Seoul (KR)

(72) Inventors: Jin Sung Kim, Seoul (KR); Seung Sam Baek, Jeju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/461,240

(22) Filed: Aug. 15, 2014

(65) Prior Publication Data

US 2015/0149029 A1    May 28, 2015

(30) Foreign Application Priority Data

Nov. 25, 2013    (KR) .......................... 10-2013-0143664

(51) Int. Cl.
  *G01M 17/00* (2006.01)
  *B60W 10/02* (2006.01)
  *G01L 3/24* (2006.01)

(52) U.S. Cl.
  CPC ........................................ *G01L 3/24* (2013.01)

(58) Field of Classification Search
  USPC .......................................... 701/32.9; 477/181
  See application file for complete search history.

(56) References Cited

U.S. PATENT DOCUMENTS

| | | | | |
|---|---|---|---|---|
| 2004/0166987 A1* | 8/2004 | Buchanan et al. | ............... | 477/70 |
| 2004/0166992 A1* | 8/2004 | Buchanan et al. | ............ | 477/181 |
| 2006/0154786 A1* | 7/2006 | Fahland et al. | ............... | 477/174 |
| 2008/0058153 A1* | 3/2008 | Kruse et al. | ........................ | 477/3 |
| 2010/0273607 A1* | 10/2010 | Winkler et al. | ............... | 477/115 |
| 2011/0004383 A1* | 1/2011 | Seufert et al. | .................... | 701/60 |
| 2011/0257857 A1* | 10/2011 | Weingartz et al. | .............. | 701/68 |
| 2012/0252632 A1 | 10/2012 | Goeppert | | |
| 2013/0018556 A1* | 1/2013 | Williams et al. | ................ | 701/60 |
| 2013/0184951 A1* | 7/2013 | Whitton et al. | ................. | 701/67 |
| 2013/0312556 A1* | 11/2013 | Reuschel | ........................ | 74/331 |
| 2015/0046049 A1* | 2/2015 | Shelton et al. | .................. | 701/54 |

FOREIGN PATENT DOCUMENTS

EP     2 136 194 B1    10/2010
JP     6-221419 A      8/1994

(Continued)

OTHER PUBLICATIONS

Bahram Shafai et al., Design of PI Observer for Bilinear Systems with Unknown Input Disturbance, 2012 IEEE International Conference on Control Application, Oct. 3-5, 2012, Dubrovnik, Croatia.

*Primary Examiner* — Thomas G Black
*Assistant Examiner* — Tyler Paige
(74) *Attorney, Agent, or Firm* — Morgan, Lewis & Bockius LLP

(57) ABSTRACT

A method of estimating a torque of a transmission clutch may include correcting an error by deducing an engine transient torque based on an engine angular velocity measured using a sensor, an engine static torque deduced using a data map, and a load torque depending on a driving load, deducing an engine angular velocity estimation value based on the engine static torque and the engine transient torque, and deducing a clutch torque estimation value depending on a slip in the transmission clutch from a difference between the engine angular velocity estimation value and the measured engine angular velocity.

7 Claims, 2 Drawing Sheets

(56) References Cited

FOREIGN PATENT DOCUMENTS

| | | |
|---|---|---|
| JP | 2004-251447 A | 9/2004 |
| JP | 2006-523292 A | 10/2006 |
| JP | 2008-69851 A | 3/2008 |
| JP | 2010-516957 A | 5/2010 |
| JP | 2013-044373 A | 3/2013 |
| JP | 2013 057333 A | 3/2013 |
| KR | 10-2013-0060071 A | 6/2013 |

* cited by examiner

TORQUE ESTIMATION METHOD FOR TRANSMISSION CLUTCH

CROSS-REFERENCE(S) TO RELATED APPLICATION

The present application claims priority of Korean Patent Application Number 10-2013-0143664 filed on Nov. 25, 2013, the entire contents of which application are incorporated herein for all purposes by this reference.

BACKGROUND OF INVENTION

1. Field of Invention

The present invention relates, in general, to a transmission clutch and, more particularly, to a torque estimation method for a transmission clutch which estimates an accurate torque value that is transmitted via slip in the clutch, in particular, a dry clutch of a dual clutch transmission (DCT).

2. Description of Related Art

Recently, many developments have been made in dual clutch transmissions (DCTs) which can realize the convenience of driving of an automatic transmission and the fuel efficiency and high power efficiency of a manual transmission. A DCT refers to an automated transmission based on a manual transmission, and is a system that has two torque transmission shafts and automatically controls a clutch without a torque converter. The DCT has the advantage of high fuel efficiency. However, since the DCT system using a dry clutch causes the clutch to directly engage two working parts without the torque converter, the ability to control the clutch determines the performance of departure and gear-shifting of a vehicle. In addition, since it is impossible to directly measure a transmission torque occurring at the frictional surfaces of clutch disks, it is important to determine the clutch transmission torque using information on a preset value of a sensor mounted in the vehicle.

A conventional clutch torque estimation method uses the observer theory of control engineering. This is a method of calculating a transmission torque that occurs when a clutch disk slips based on an engine torque. Here, the engine torque output from an electronic control unit (ECU) is based on data produced through repeated tests in the static state. However, since the point of time where clutch torque information is required always corresponds to the transient state (creep, departure, or the like) of the engine, a difference occurs between the engine torque of the ECU and an actual value. Therefore, the clutch torque estimation value produced based on the unreliable engine torque also has an error, which is problematic.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a method of accurately estimating a clutch torque by correcting an error in an unreliable engine torque model. The present invention is intended to provide a torque estimation method for a transmission clutch which estimates an accurate torque value that is transmitted via slip in the clutch, in particular, a dry clutch of a dual clutch transmission (DCT).

According to various aspects of the present invention, there is provided a method of estimating a torque of a transmission clutch that includes the following steps: correcting an error by deducing an engine transient torque based on an engine angular velocity measured using a sensor, an engine static torque deduced using a data map, and a load torque depending on a driving load, deducing an engine angular velocity estimation value based on the engine static torque and the engine transient torque, and deducing a clutch torque estimation value depending on a slip in the transmission clutch from a difference between the engine angular velocity estimation value and the measured engine angular velocity.

According to an aspect of the present invention, the step of deducing the engine angular velocity estimation value may be further based on the deduced clutch torque estimation value through feedback of the deduced clutch torque estimation value.

The step of correcting the error may include deducing an engine power torque based on integration of the engine angular velocity and an engine moment of inertia, wherein the deducing of the engine transient torque is based on the engine power torque, the engine static torque and the load torque. The deducing of the engine transient torque may be conducted by subtracting the engine static torque from the engine power torque and adding the load torque to a result of subtracting the engine static torque from the engine power torque.

The step of correcting the error may include deducing a final engine transient torque from the deduced engine transient torque through low-pass filtering.

The deducing of the angular velocity estimation value may include adding the engine static torque and the engine transient torque to produce a total torque, and dividing the total torque by an engine moment of inertia to determine the engine angular velocity estimation value.

In addition, according to various other aspects of the present invention, there is provided a method of estimating a torque of a transmission clutch, comprising: correcting an error by deducing an engine transient torque corresponding to an engine power torque in a transient state, deducing an engine angular velocity estimation value based on an engine static torque and the engine transient torque, and deducing a clutch torque estimation value depending on a slip in the transmission clutch from a difference between the engine angular velocity estimation value and an engine angular velocity.

According to the torque estimation method for a transmission clutch as set forth above, it is possible to estimate an accurate torque value that is transmitted via slip in the clutch, in particular, a dry clutch of a DCT.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
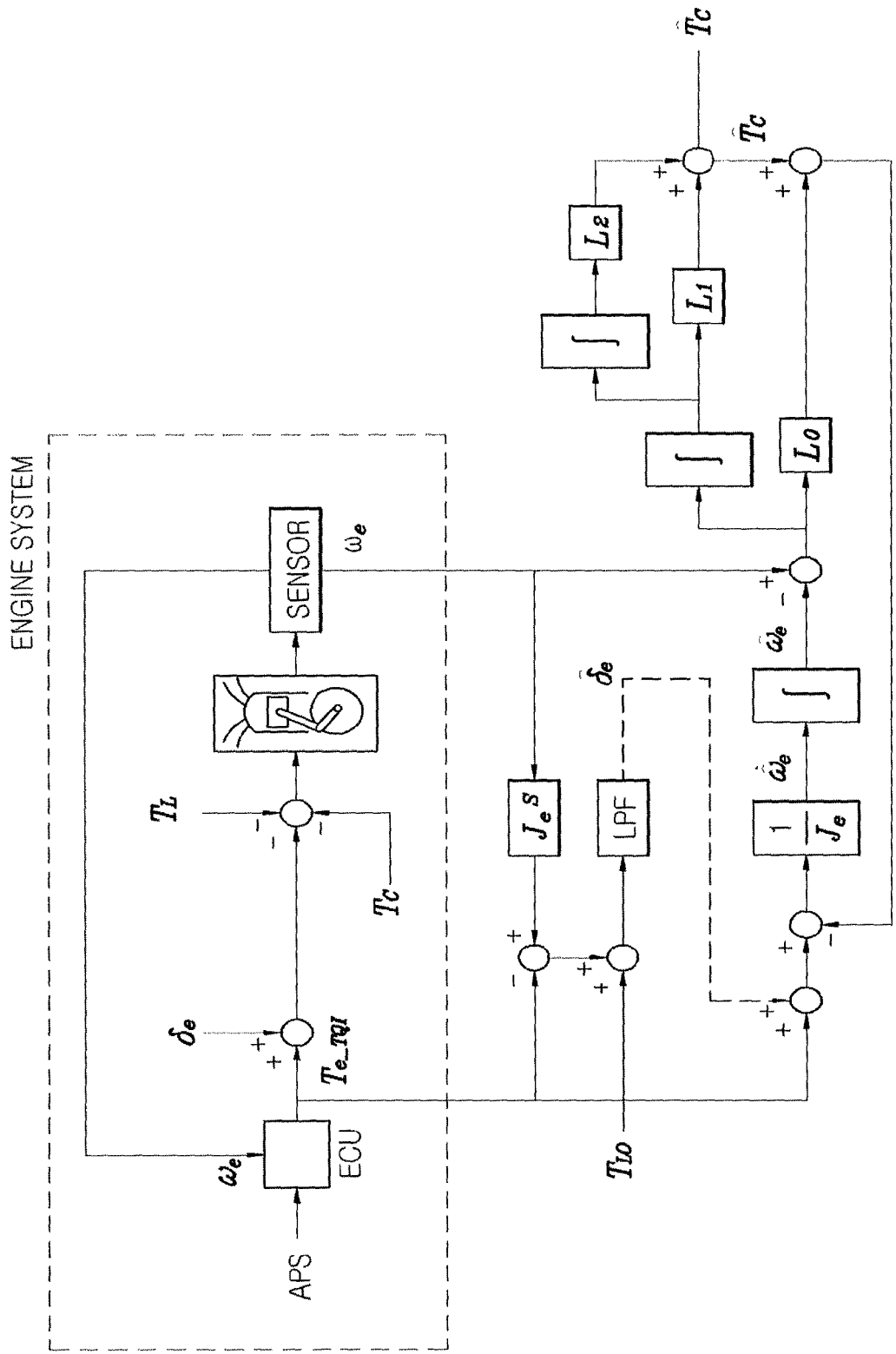
FIG. 1 is a block diagram showing an exemplary torque estimation method for a transmission clutch according to the present invention.
Figure 2:
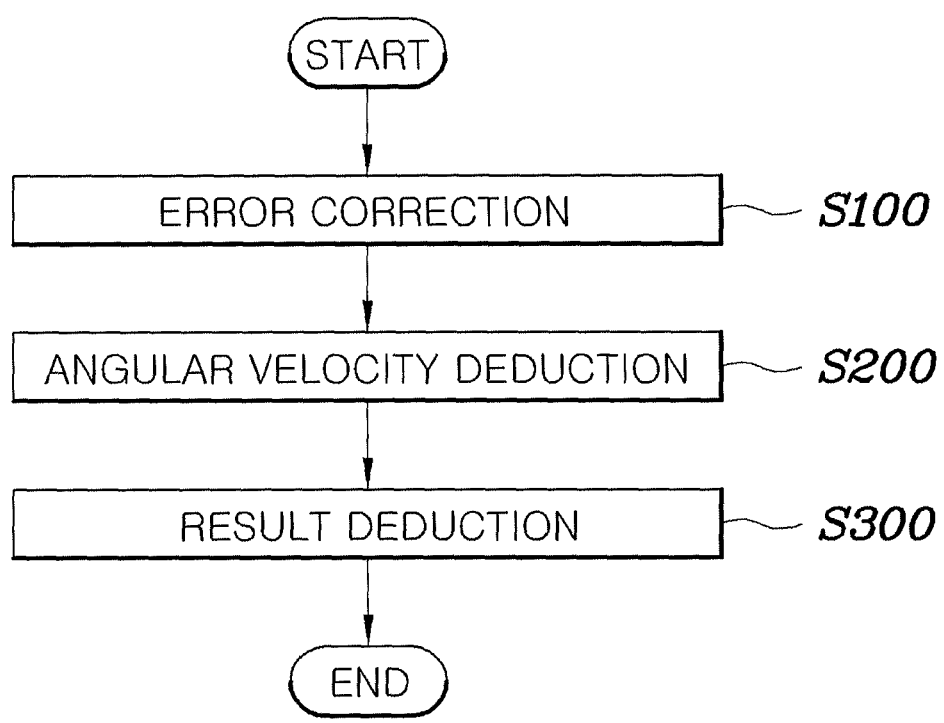
FIG. 2 is a flowchart showing an exemplary torque estimation method for a transmission clutch according to the present invention.

FIG. 1 is a block diagram showing a torque estimation method for a transmission clutch, and FIG. 2 is a flowchart showing the torque estimation method for a transmission clutch according to various embodiments of the present invention. The torque estimation method for a transmission clutch includes an error correction step S100 of deducing an engine transient torque based on an engine angular velocity measured using a sensor, an engine static torque deduced using a data map, and a load torque depending on a driving load, an angular velocity deduction step S200 of deducing an engine angular velocity estimation value based on the engine static torque and the engine transient torque, and a result deduction step S300 of deducing a clutch torque estimation value depending on a slip in the transmission clutch from a difference between the engine angular velocity estimation value and the engine angular velocity.

Referring to the block diagram shown in FIG. 1, as for an engine system at the point of view of dynamics, the engine static torque $T_{e\_TQI}$ and the engine transient torque $\delta_e$ are regulated as the total torque from the engine. From this, a loss in an actual load torque TL due to a driving load and a loss in an actual clutch torque TC due to the slip of the transmission clutch occur, and are then output to a flywheel side. A speed sensor is provided on the flywheel, and measures an actual angular velocity $\omega_e$.

Specifically, it is possible to produce the engine static torque $T_{e\_TQI}$ in the steady state by receiving a pedal treading amount (APS) and the engine angular velocity $\omega_e$ measured using a velocity sensor at the flywheel side and substituting the pedal treading amount (APS) and the engine angular velocity $\omega_e$ to a data map which is prepared as test values in an engine electronic control unit (ECU). In addition, an actual driving torque of the engine is produced by adding the engine transient torque $\delta_e$ to the engine static torque $T_{e\_TQI}$.

Therefore, in order to accurately estimate the clutch slip torque in the transmission, it is required to accurately estimate and reflect the engine transient torque in the transient state that frequently occurs in a low RPM range of the engine in order to accurately estimate the clutch torque. This also has a great effect on the endurance of the clutch, especially, involving the control over a dry clutch of the DCT transmission.

The proposition about engine dynamics can be expressed by the following formula:

$$J_e \dot{\omega}_e = T_{e\_TQI} + \dot{\omega}_e - T_c - T_L \quad \text{Formula 1}$$

where:
$J_e$: Engine moment of inertia
$\omega_e$: Reconstructed engine speed
$\bar{\omega}_e$: Filtered engine speed
$T_{e\_TQI}$: Engine torque from EMS
$\hat{T}_c$: Estimated clutch torque
$L_1, L_2, L_3$: Torque observer gains
$\hat{\delta}_e$: Estimated engine torque error
$T_L$: Vehicle load (actual driving load)
$T_{L0}$: Nominal vehicle load (value calculated according to driving load formula)

Specifically, as shown in FIG. 1, the step of error correction step of deducing the engine transient torque $\hat{\delta}_e$ based on the engine angular velocity $\omega_e$ measured using the sensor, engine static torque $T_{e\_TQI}$ deduced using the data map and the load torque $T_{L0}$ depending on the driving load is carried out. The error correction step can deduce an engine power torque based on differential of the engine angular velocity and an engine moment of inertia, and deduce the engine transient torque based on the engine power torque, the engine static torque and the load torque. In addition, the error correction step can deduce the engine transient torque by eliminating the engine static torque from the engine power torque and adding the load torque to the result.

In addition, the error correction step can deduce a final result of the engine transient torque from the deduced engine transient torque through low-pass filtering.

Specifically, the measured engine angular velocity $\omega_e$ is differentiated, and then is multiplied with the engine moment of inertia $J_e$, thereby producing an actual torque of an engine output end. The engine static torque $T_{e\_TQI}$ produced using the data map is removed from the actual engine torque. In addition, it is possible to produce the engine transient torque $\hat{\delta}_e$ by adding the load torque $T_{L0}$ to the calculated driving torque. In addition, since the engine operates within a specific frequency range (for example, a range below 5 Hz) in the transient state, an accurate value of the engine transient torque can be produced through the low-pass filtering. The produced engine transient torque $\hat{\delta}_e$ is defined as an estimated value in the logic.

For reference, in FIG. 1 the differential of the measured engine angular velocity $\omega_e$ is shown as 's' which is a Laplace Transform thereof.

For reference, the load torque $T_{L0}$ can be calculated according to the following formula:

$$T_{L0} = \left( M_v g \sin\theta + K_r M_v g \cos\theta + \frac{1}{2} \rho C_d A_F v_x^2 \right) * \frac{r_{wheel}}{i} \quad \text{Formula 2}$$

where:
$M_v$: Vehicle mass
g: Gravitational acceleration
$\theta$: Slope angle
$K_r$: Rolling resistance coefficient
$\rho$: Air density
$C_d$: Air drag force coefficient
$A_f$: Frontal area
$v_s$: Vehicle speed
$r_{wheel}$: Efficient wheel radius
i: Total gear ratio (transmission, final gear)

Afterwards, the remains (deducing an engine angular velocity estimation value and deducing a clutch torque estimation value) constitute a so-called unknown input observer and substantially belong to prior arts, the angular velocity deduction step of deducing the engine angular velocity estimation value based on the engine static torque and the engine transient torque is carried out. The angular velocity deduction step can deduce the engine angular velocity estimation value by considering the engine static torque, the engine transient torque and the clutch torque estimation value through feedback of the clutch torque estimation value estimated in the result deduction step.

In addition, the angular velocity deduction step can add the engine static torque and the engine transient torque and inversely deduce the engine angular velocity estimation value based on the engine moment of inertia.

That is, a total torque of the engine is produced by adding an estimated value of engine transient torque $\hat{\delta}_e$ and the engine static torque $T_{e\_TQI}$. The total torque is divided by the engine moment of inertia $J_e$, followed by integration, thereby producing the engine angular velocity estimation value $\hat{\omega}_e$.

Based on the theoretical assumption that the influence of the clutch torque is reflected on the difference between the actually-measured engine angular velocity $\omega_e$ and the engine angular velocity estimation value $\hat{\omega}_e$, a clutch torque estimation value $\hat{T}_c$ can be produced using an integration of the difference and coefficients $L_1$ and $L_2$.

In addition, the clutch torque estimation value $\hat{T}_c$ is fed back together with the actually-measured engine angular velocity $\omega_e$ and the engine angular velocity estimation value $\hat{\omega}_e$, and is used for the deduction of the clutch torque estimation value.

As shown in FIG. 1, after the value that is to be fed-back is removed from the sum of the engine static torque $T_{e\_TQI}$ and engine transient torque $\hat{\delta}_e$, the engine angular velocity estimation value $\hat{\omega}_e$ is deduced. Thus, through repeated feedback, the result converges to an accurate clutch torque estimation value.

In this feedback control, coefficients $L_0$, $L_1$ and $L_2$ are present as tuning factors. In other words, according to an engine dynamics, an engine angular acceleration value $\dot{\omega}_e$ is $$\dot{\omega}_e = \frac{T_e}{J_e} - \frac{T_c}{J_e}$$

an engine angular acceleration estimation value $\widehat{\dot{\omega}_e}$ is shown as below, $$\hat{\dot{\omega}}_e = \frac{T_e}{J_e} - \frac{\hat{T}_c}{J_e} + L_0(\omega_e - \hat{\omega}_e)$$

Here, the clutch torque estimation value $\hat{T}_c$ is able to be defined arbitrarily.

$$\hat{T}_c = -L_1(\omega_e - \hat{\omega}_e) - L_2(\omega_e - \hat{\omega}_e)$$

Thus, if the unknown input observer is repeatedly performed with adequate coefficients L0, L1 and L2 which are defined arbitrary in the first stage, the clutch torque estimation value $\hat{T}_c$ converges into an actual clutch torque gradually. It is desired that the coefficients L0, L1 and L2 are defined as bigger values than zero at the first stage.

According to various embodiments of the present invention as set forth above, it is possible to correct an error between an engine torque value of the ECU and an actual engine torque in real time, apply the corrected value for the estimation of a clutch torque, and accurately estimate the clutch torque in a driving range in which the engine torque is unreliable. In addition, it is possible to improve reliability and accuracy over the conventional engine torque-based method, and exclude an engine torque error correction logic in a normal state. Furthermore, there is an advantage in that information between the clutch torque and the position of the clutch actuator (torque-stroke diagram) is not required.

Actually, a controller like TCU (Transmission Control Unit) is able to perform the present invention's method of estimating a torque of a transmission clutch with receiving an engine angular velocity from the sensor and an engine static torque from the ECU or the data map, and use the estimated torque of the clutch for controlling the clutch in case of shifting of gears and so on.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of estimating a torque of a transmission clutch, comprising:
   correcting, by a controller, an error of the torque by deducing an engine transient torque based on an engine angular velocity measured using a sensor, an engine static torque deduced using a data map, and a load torque depending on a driving load;
   deducing, by the controller, an engine angular velocity estimation value based on the engine static torque and the engine transient torque;
   deducing, by the controller, a clutch torque estimation value depending on a slip in the transmission clutch from a difference between the engine angular velocity estimation value and the measured engine angular velocity; and
   controlling, by the controller, the transmission clutch, using the clutch torque estimation value.

2. The method according to claim 1, wherein the deducing of the engine angular velocity estimation value is further based on the deduced clutch torque estimation value through feedback of the deduced clutch torque estimation value.

3. The method according to claim 1, wherein the correcting of the error comprises:
   deducing an engine power torque based on differential of the engine angular velocity and an engine moment of inertia, wherein the deducing of the engine transient torque is based on the engine power torque, the engine static torque and the load torque.

4. The method according to claim 3, wherein the deducing of the engine transient torque is conducted by subtracting the engine static torque from the engine power torque and adding the load torque to a result of subtracting the engine static torque from the engine power torque.

5. The method according to claim 1, wherein the correcting of the error comprises:
   deducing a final engine transient torque from the deduced engine transient torque through low-pass filtering.

6. The method according to claim 1, wherein the deducing of the engine angular velocity estimation value comprises:

adding the engine static torque and the engine transient torque to produce a total torque; and dividing the total torque by an engine moment of inertia to determine the engine angular velocity estimation value.

7. A method of estimating a torque of a transmission clutch, comprising:

correcting, by a controller, an error of the torque by deducing an engine transient torque corresponding to an engine power torque in a transient state;

deducing, by the controller, an engine angular velocity estimation value based on an engine static torque and the engine transient torque;

deducing, by the controller, a clutch torque estimation value depending on a slip in the transmission clutch from a difference between the engine angular velocity estimation value and an engine angular velocity; and controlling, by the controller, the transmission clutch, using the clutch torque estimation value.

\* \* \* \* \*